(12) United States Patent
Kruppe et al.

(10) Patent No.: US 10,767,776 B2
(45) Date of Patent: Sep. 8, 2020

(54) PRESSURE RELIEF VALVE WITH STOP

(71) Applicant: Cyrus Shank Corporation, Aurora, IL (US)

(72) Inventors: Frank Kruppe, Aurora, IL (US); Matt Powell, Aurora, IL (US)

(73) Assignee: Cyrus Shank Corporation, Aurora, IL (US)

( * ) Notice: Subject to any disclaimer, the term of this patent is extended or adjusted under 35 U.S.C. 154(b) by 0 days.

(21) Appl. No.: 15/728,131

(22) Filed: Oct. 9, 2017

(65) Prior Publication Data

US 2019/0107218 A1 Apr. 11, 2019

(51) Int. Cl.
| | |
|---|---|
| *F16K 27/00* | (2006.01) |
| *F16K 27/02* | (2006.01) |
| *F16K 17/04* | (2006.01) |
| *F25B 41/04* | (2006.01) |
| *F16K 17/06* | (2006.01) |
| *F16K 15/02* | (2006.01) |

(52) U.S. Cl.
CPC .......... *F16K 27/0209* (2013.01); *F16K 17/04* (2013.01); *F16K 17/06* (2013.01); *F25B 41/04* (2013.01); *F16K 15/026* (2013.01); *F25B 2600/2525* (2013.01)

(58) Field of Classification Search
CPC .... F16K 17/04; F16K 7/0209; F16K 27/0209; F16K 17/06; F16K 15/02
USPC ....................................................... 137/535
See application file for complete search history.

(56) References Cited

U.S. PATENT DOCUMENTS 2,415,258 A * 2/1947 Parker ................. F16K 17/0406
137/536

* cited by examiner

*Primary Examiner* — P. Macade Nichols
(74) *Attorney, Agent, or Firm* — Seyfarth Shaw LLP

(57) ABSTRACT

A pressure relief valve with a stop disposed thereon to ensure components of the pressure relief valve are properly aligned and tightened properly. This allows the components and pressure relief valve to be properly installed and the pressure relief valve to function properly. The stop feature also reduces the time of installation and amount of labor needed to install pressure relief valves and their components.

15 Claims, 2 Drawing Sheets

PRESSURE RELIEF VALVE WITH STOP

FIELD

The present invention relates generally to pressure relief valves. More particularly, the present invention relates to an improved pressure relief valve having a stop to assist in alignment of the valve.

BACKGROUND

Pressure relief valves are commonly used in many industries, including the refrigeration industry. Pressure relief valves are used to control pressure within systems and containers, and flow through such systems and into and out of containers. In general, pressure relief valves are replaced every five years, or sooner if the pressure relief valve is actuated prior to the five years. Replacing these pressure relief valves and/or their components can be time consuming and labor intensive. For example, when installing a pressure relief valve it is important that the valve is aligned properly in order for the valve to function properly.

SUMMARY

The present invention relates to a pressure relief valve with a stop disposed thereon to ensure components of the pressure relief valve are properly aligned and tightened properly. This allows the components and pressure relief valve to be properly installed and the pressure relief valve to function properly. The stop feature also reduces the time of installation and amount of labor needed to install pressure relief valves and their components.

An embodiment of the present invention broadly comprises a valve. The valve includes a valve body having inlet and outlet ports. A valve seat is disposed in a fluid flow path between the inlet and outlet ports. A pressure relief valve body is disposed in and coupled to the valve body, and the pressure relief valve has a relief port aligned with the outlet port. A valve head is disposed in the pressure relief valve body and biased into engagement with the valve seat. The valve head is movable between an unactuated position in which the valve head is engaged with the valve seat, and an actuated position in which the valve head is disengaged with the valve seat. A stop is adapted to provide an indication when the pressure relief valve body is coupled to the valve body and the relief port is aligned with the outlet port.

Another embodiment of the present invention broadly comprises a valve including a valve body having a relief port. A valve seat is disposed in the valve body upstream of the relief port. A valve head is disposed in the valve body and biased into engagement with the valve seat. The valve head is movable between an unactuated position in which the valve head is engaged with the valve seat, and an actuated position in which the valve head is disengaged with the valve seat. A stop is adapted to provide an indication when the valve body is installed.

BRIEF DESCRIPTION OF THE DRAWINGS

For the purpose of facilitating an understanding of the invention, there are illustrated in the accompanying drawings embodiments thereof, from an inspection of which, when considered in connection with the following description, the invention, its construction and operation, and many of its advantages should be readily understood and appreciated.

DETAILED DESCRIPTION

Figure 1:
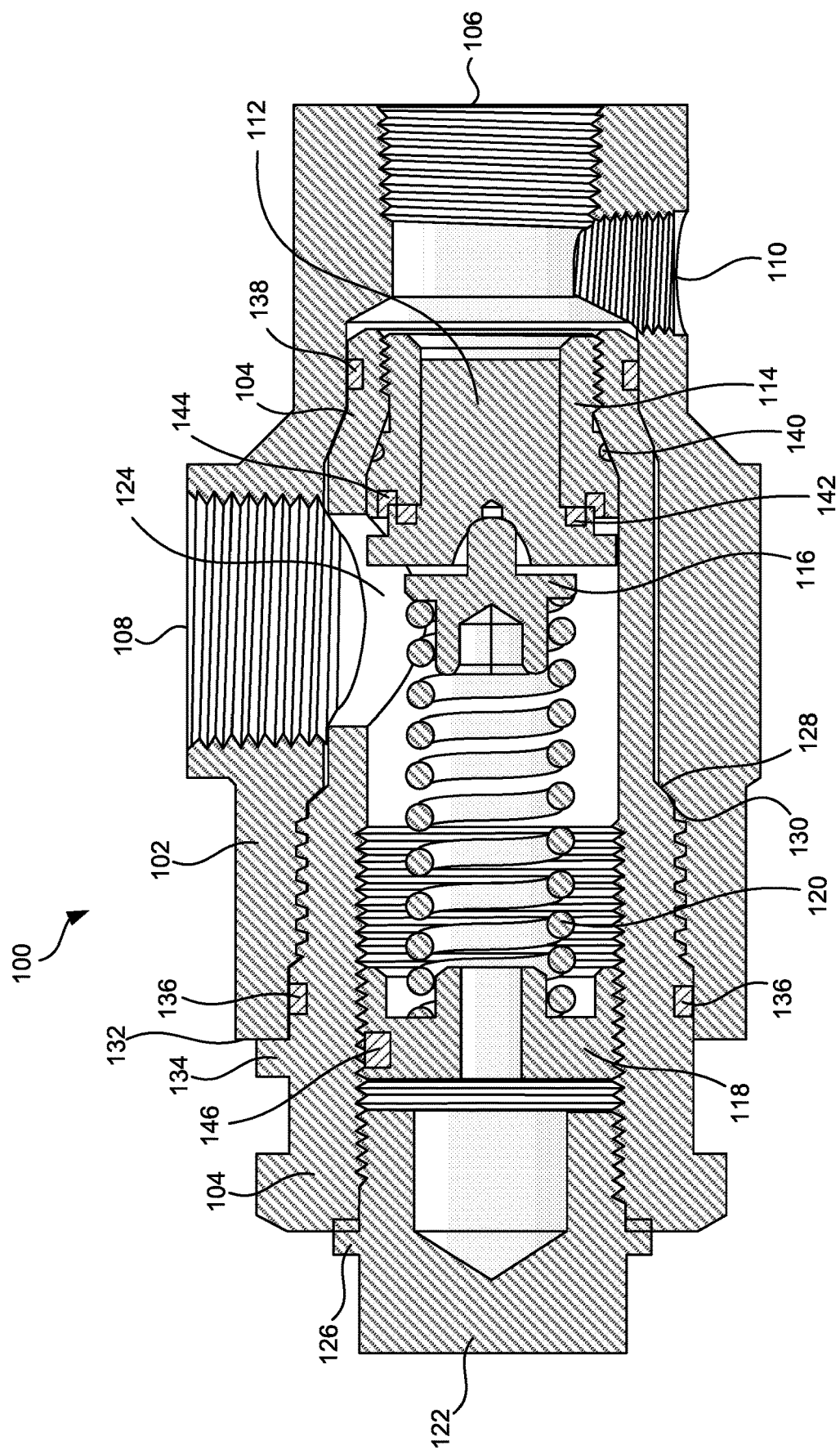
FIG. 1 is a sectional side view of a pressure relief valve in an first (unactuated) position according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Embodiments of the present invention broadly comprise a pressure relief valve with a stop disposed thereon to ensure components of the pressure relief valve are properly aligned and tightened properly. This allows the components and pressure relief valve to be properly installed and the pressure relief valve to function properly. The stop feature also reduces the time of installation and amount of labor needed to install pressure relief valves and their components.

Figure 2:
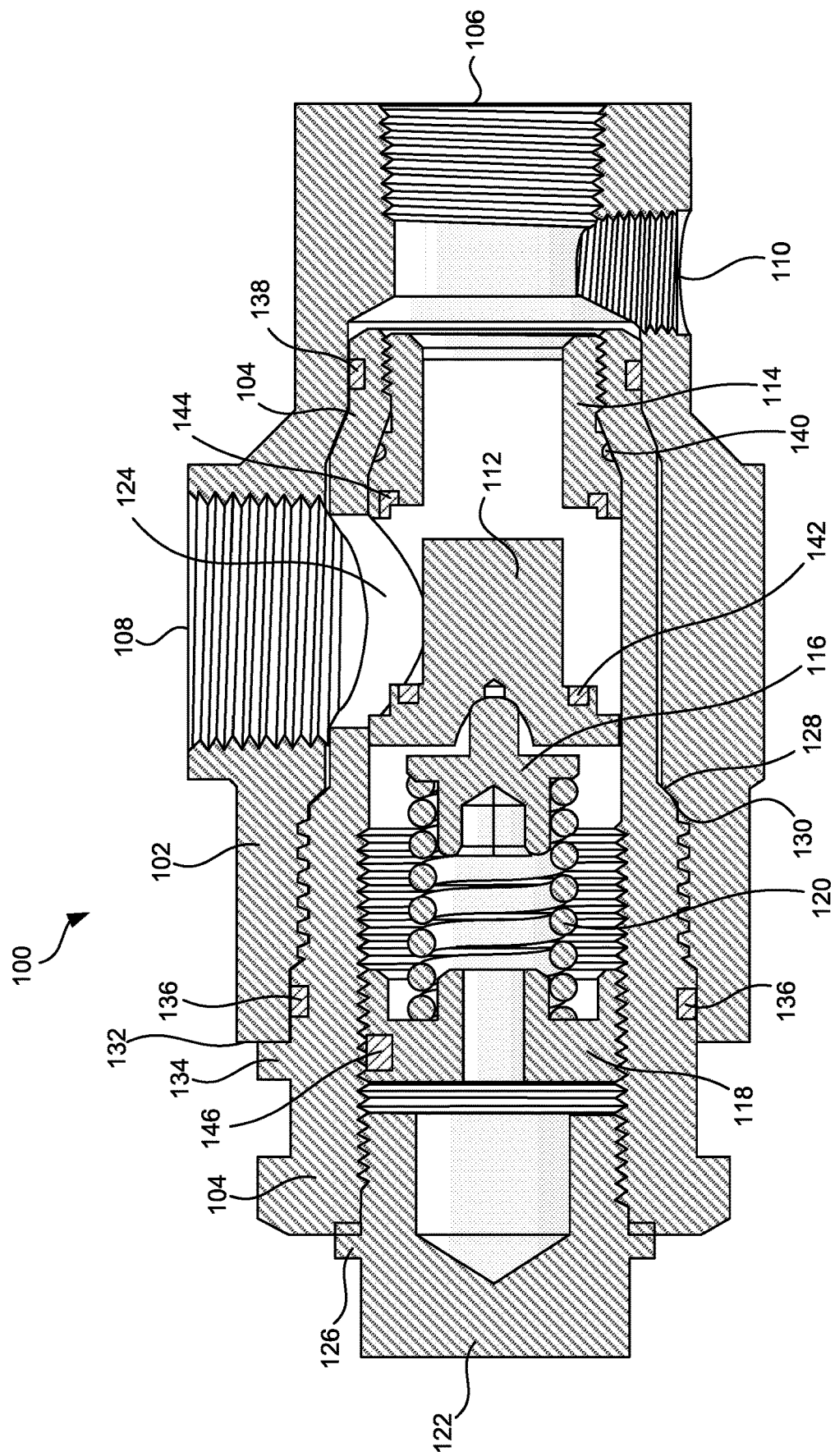
FIG. 2 is a sectional side view of the pressure relief valve in a second (actuated) position according to an embodiment of the present invention.

Referring to FIGS. 1 and 2, a pressure relief valve 100 (also referred to as a valve 100) includes a valve body 102 and a pressure relief valve (PRV) body 104 installed in the valve body 102. The valve body 102 includes a first port 106 (also known as an inlet port) extending into the valve body 102 and a second port 108 (also known as an outlet port). The valve body 102 may also include a third port 110 adapted to receive a screw or plug (such as a head plug).

In normal operation (when the pressure relief valve is in an unactuated position, as illustrated in FIG. 1), fluidic communication between the first port 106 and second port 108 is closed by a valve head 112 of the pressure relief valve 100. However, when the pressure relief valve is in an actuated position (as illustrated in FIG. 2), fluidic communication between the first port 106 and second port 108 is opened; thereby allowing pressure and/or fluid to be released out of the second port 108.

The PRV body 104 houses various components of the pressure relief valve 100, and is adapted to be inserted into and coupled to the valve body 102. For example, the components may include the valve head 112, a valve seat 114, a guide 116, an adjustment member 118, a bias member 120, a cap 122, and a relief port 124. The PRV body 104 has first and second opposing ends, and is disposed in the valve body 102 with the first end proximate to the first port 106 and the relief port 124 in alignment with the second port 108 of the valve body 102. As illustrated, the second end of the PRV body 104 is coupled (for example, via a threaded connection) to and extends out of an end of the valve body 102 opposite the first port 106.

As illustrated, the cap 122 may include stops 126 that assist with proper tightening and compression of the bias member 120, as well as proper installation and alignment of the PRV body 104 in the valve body 102. For example, the cap 122 is coupled to the second end of the PRV body 104. To prevent overtightening of the cap 122, and improper compression of the bias member 120, the stops 126 provide an indication when the cap 122 is properly installed in the PRV body 104, and/or when the PRV body 102 is properly installed and aligned in the valve body 102.

To further assist with proper installation and alignment of the PRV body 104 in the valve body 102, the valve body 102 may include a chamfer 128, and the PRV body 104 may include a corresponding mating chamfer 130. These chamfers 128 and 130 may engage or abut one another when the PRV body 104 is properly installed in the valve body 102. The valve body 102 may also include a ledge 132 at the end of the valve body opposite the first port 106, and the PRV body 104 may include a corresponding stop protrusion with a ledge 134 that also engages or abuts the ledge 130 when the PRV body 104 is properly installed in the valve body 102. One or more seals, such as O-rings, Teflon rings, or other sealing type ring, etc., may also be used to provide fluid tight seals between the PVR body 104 and valve body 102. For example, seals 136 and 138 may be used to provide fluid tight seals between the PVR body 104 and valve body 102.

The valve seat 114 may be installed in and coupled to the first end of the PRV body 104 in a fluid flow path between the first port 106 and the second port 108. A seal 140, such as an O-ring, Teflon ring, or other sealing type ring, etc., may also be used to provide a fluid tight seal between the valve seat 114 and the PVR body 104.

The valve head 112 is slidably receivable in the valve seat 114. When the valve 100 (or valve head 112) is in the unactuated position, the valve head 112 is disposed in the valve seat 114 and fluid flow between the first port 106 and the second port 108 is closed. One or more seals, such as O-rings, Teflon rings, or other sealing type ring, etc., may also be used to provide fluid tight seals between the valve head 112 and the valve seat 114, when the valve 100 in in the unactuated portion. For example, seals 142 and 144 may be used to provide fluid tight seals between the valve head 112 and the valve seat 114. However, when the valve 100 (or valve head 112) is in the actuated position, the valve head 112 is removed from the valve seat 114 and fluid flow between the first port 106 and the second port 108 is open.

The guide 116 is disposed on an end of the valve head opposite the valve seat 114. The adjustment member 118 may be installed in and coupled to the PRV body 104 proximate the second end of the PRV body 104 and the cap 112. A seal 146, such as an O-ring, Teflon ring, or other sealing type ring, etc., may also be used to provide a fluid tight seal between the adjustment member 118 and the PVR body 104. The bias member 118, which may be a spring or other type of suitable bias member, is disposed between the adjustment member 118 and the guide 116. The bias member 118 biases the guide 116 away from the adjustment member 118 and towards the valve head 112. The bias member 118 also causes the guide 116 to engage the valve head 112, and biases the valve head 112 into engagement with the valve seat 114. This closes fluid flow between the first port 106 and second port 108. The bias member 120 provides a bias force, thereby defining a pressure threshold. The amount of bias force (and thereby pressure threshold value) may be adjusted by adjusting the location of the adjustment member 118 within the PRV body 104. For example, the closer the adjustment member 118 is positioned with respect to the valve seat 114, the larger the bias force (and higher the pressure threshold), and vice versa.

When the valve 100 (and valve head 112) is in the first (unactuated) position, as illustrated in FIG. 1, the valve head 112 is disposed in the valve seat 114 and fluid flow between the first port 106 and the second port 108 is closed. When pressure at the first (inlet) port 106 meets or exceeds the pressure threshold provided by the bias member 120, the valve 100 (and valve head 112) are moved into the second (actuated) position, as illustrated in FIG. 2. For example, the valve head 112 is pushed against the bias force out of engagement with the valve seat 114. This opens fluid flow between the first port 106 and the second port 108. This fluid flows from the first (inlet) port 106, through the relief port 124, and out of the second (outlet) port 108, thereby releasing the pressure.

It should be appreciated that the valve 100 may be used in any number of systems that may include or require a pressure relief valve. One examples of such type of systems may include refrigeration systems that use ammonia or carbon dioxide as a fluid. Other examples of systems include systems that use water, oil, fuel, air, one or more chemicals, etc. as a fluid.

As used herein, the terms "coupled," "coupling," and its functional equivalents are not intended to necessarily be limited to a direct, mechanical coupling of two or more components. Instead, the term "coupled" and its functional equivalents are intended to mean any direct or indirect mechanical, electrical, or chemical connection between two or more objects, features, work pieces, and/or environmental matter. In one example, the term "coupled" and its functional equivalents are intended to mean a threaded connection. "Coupled" is also intended to mean, in some examples, one object being integral with another object.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A valve, comprising:
    a valve body having inlet and outlet ports and defining a fluid flow path between the ports;
    a valve seat disposed in the fluid flow path;
    a pressure relief valve body disposed in and coupled to the valve body, wherein the pressure relief valve includes a relief port aligned with the outlet port;
    a valve head disposed in the pressure relief valve body and biased into engagement with the valve seat, wherein the valve head is movable between an unactuated position, wherein the valve head is engaged with the valve seat, and an actuated position, wherein the valve head is disengaged with the valve seat; and
    a stop extending radially outwardly and disposed proximate to an end of the pressure relief valve body opposite the valve seat, wherein the stop is adapted to provide a contact indication when the pressure relief valve body is coupled to the valve body and the relief port is aligned with the outlet port.

2. The valve of claim 1, further comprising a guide disposed in the pressure relief valve body proximate to the valve head.

3. The valve of claim 2, further comprising a bias member disposed in the pressure relief valve body, wherein the bias member biases the guide towards the valve head and the valve head into engagement with the valve seat.

4. The valve of claim 3, further comprising a cap coupled to the end of the pressure relief valve body, and wherein the stop is disposed on the cap.

5. The valve of claim 3, further comprising an adjustment member disposed in the pressure relief valve body, and the bias member is disposed between the adjustment member and the guide.

6. The valve of claim 1, wherein the valve seat is disposed in the pressure relief valve body.

7. The valve of claim 1, wherein the stop includes a protrusion extending radially outwardly from the pressure relief valve body, wherein the protrusion is adapted to contact a ledge of the valve body when the pressure relief valve body is coupled to the valve body.

8. The valve of claim 1, wherein the pressure relief valve body includes a chamfer adapted to engage a corresponding chamfer of the valve body when the pressure relief valve body is coupled to the valve body.

9. A valve, comprising:
a valve body having a relief port;
a valve seat disposed in the valve body upstream of the relief port;
a valve head disposed in the valve body and biased into engagement with the valve seat, wherein the valve head is movable between an unactuated position, wherein the valve head is engaged with the valve seat, and an actuated position, wherein the valve head is disengaged with the valve seat; and
a stop extending radially outwardly proximate to an end of the valve body opposite the valve seat, wherein the stop is adapted to provide a contact indication when the valve body is installed.

10. The valve of claim 9, further comprising a guide disposed in the valve body proximate to the valve head.

11. The valve of claim 10, further comprising a bias member disposed in the valve body, wherein the bias member biases the guide towards the valve head and the valve head into engagement with the valve seat.

12. The valve of claim 11, further comprising a cap coupled to the end of the valve body, and wherein the stop is disposed on the cap.

13. The valve of claim 11, further comprising an adjustment member disposed in the valve body, and the bias member is disposed between the adjustment member and the guide.

14. The valve of claim 9, wherein the stop includes a protrusion extending radially outwardly from the valve body, wherein the protrusion is adapted to provide the contact indication when the valve body is installed.

15. The valve of claim 9, wherein the valve body includes a chamfer adapted to engage a corresponding chamfer of a second valve body when the valve body is coupled to the second valve body.

* * * * *